United States Patent [19]
Sano et al.

[11] Patent Number: 5,231,363
[45] Date of Patent: Jul. 27, 1993

[54] PULSE WIDTH MODULATING PRODUCING SIGNALS CENTERED IN EACH CYCLE INTERVAL

[75] Inventors: Takayuki Sano, Urawa; Yasuhide Igura, Matsudo, both of Japan

[73] Assignee: Texas Instruments Incorporated, Dallas, Tex.

[21] Appl. No.: 924,383

[22] Filed: Aug. 3, 1992

Related U.S. Application Data

[63] Continuation of Ser. No. 798,400, Nov. 25, 1991, abandoned.

[30] Foreign Application Priority Data

Nov. 26, 1990 [JP] Japan ................................ 2-322065

[51] Int. Cl.$^5$ ............................................... H03K 7/08
[52] U.S. Cl. ...................................... 332/109; 332/110; 375/22
[58] Field of Search .................... 332/109, 110; 375/22

[56] References Cited

U.S. PATENT DOCUMENTS 4,502,024  2/1985  Nishikawa et al. ................. 332/109

FOREIGN PATENT DOCUMENTS 58-143628  8/1983  Japan ................................ 332/109

*Primary Examiner*—Siegfried H. Grimm
*Attorney, Agent, or Firm*—William E. Hiller; Richard Donaldson; Jay M. Cantor

[57] ABSTRACT

A pulse width modulating circuit including a shift register and a subtraction circuit, with first and second binary counters respectively connected to the outputs of the shift register and the subtraction circuit, and a logic circuit connected to the outputs of the binary counters. Pulse width control data bits are input to the shift register and the subtraction circuit. The shift register processes the pulse width control data bits by shifting them one bit to the right and dividing the control data bits in half. The output of the shift register is also connected to the subtraction circuit and provides one-half of the pulse width control data bits to the inputs of the subtraction circuit and the first counter. A load signal is respectively applied to the first and second binary counters which are responsive thereto for sensing the left and right edges of a pulse width modulation signal based upon the outputs from the shift register and the subtraction circuit. The pulse width modulation signal is located in the middle of the cycle interval as generated by the load signal. Pulse position correcting circuits may be interposed between the shift register and the first counter, and between the subtraction circuit and the second counter for adjusting the position of the pulse width modulating signal to the middle of the cycle interval.

6 Claims, 6 Drawing Sheets

PULSE WIDTH MODULATING PRODUCING SIGNALS CENTERED IN EACH CYCLE INTERVAL

This application is a continuation of application Ser. No. 798,400, filed Nov. 25, 1991 and now abandoned.

FIELD OF THE INVENTION

The present invention relates to a pulse width modulating circuit, and relates in particular to a pulse width modulating circuit which generates pulse width modulating signals to be positioned near the middle of the time interval of a designated cycle.

PRIOR ART

Pulse width modulating circuits are used in a variety of circuits and devices to control pulse width modulation (PWM).

FIG. 10 shows one example, which is a pulse width modulating circuit used in a driver IC for using PWM controls to carry out color controls on the three primary colors, R, G, and B, contained in a color liquid crystal panel, flat CRT panel, etc.

In the pulse width modulating circuit shown in FIG. 10, a binary counter (20), a set-reset (S-R) flip flop (FF) (21), which consists of a combination of two NAND gates, and an inverter (22) are connected as shown in the FIGURE.

The operations of the pulse width modulating circuit shown in FIG. 10 will be explained with reference to the signal waveform diagram shown in FIG. 11.

When a "low" level load signal LOAD, which is the reset signal (or trigger signal) is applied to the reset terminal R of (FF21), (FF21) is reset by its rising. The inverted output NQ which is inverted by the inverter (22), is then output as a "low" level pulse modulation output SOUT. The binary counter (20) is also triggered by the load signal LOAD, which causes a clock CLK to begin counting. Binary pulse width control data DATA, which indicate the modulated pulse width to the setting terminal DSET, are set in the binary counter (20), so that when the count value of the clock CLK reaches the value of the pulse width control data DATA, a carry signal CARRY is output from the binary counter (20) to the set terminal S of (FF21) to set (FF21). Thus, the inverted output NQ of (FF21) turns to the "low" level, and the "low" level signal is inverted by the inverter (22), and then output as a "high" level pulse modulation output SOUT. In the following cycle, when the "low" level load signal LOAD is applied, (FF21) is again reset during its rising, thereby allowing the aforementioned operations to take place. Thus, when the value of the pulse width control data DATA is changed, a time td is adjusted until a pulse modulating output SOUT is output from the rising of the load signal LOAD, thereby making it possible during the generating cycle interval T for the load signal LOAD to change the pulse width PW of the pulse modulating output SOUT.

The circuit shown in FIG. 12 is used for the binary counter (20). The first step of the 8-bit binary counter circuit shown in FIG. 12 consists of the following: a one-increment adder (310), which consists of an AND gate (311) and exclusive logic sum (EXOR) gate (312); a data selector (313); and a D-type flip flop (314), which is a latch circuit. The circuit structures from the second step onward are also the same. IN1-IN8 correspond to the pulse width control data DATA.

FIG. 13 shows the operation timing of the binary counter shown in FIG. 12.

The binary counter shown in FIG. 12 reads the input data IN1-IN8 (corresponding to the aforementioned pulse width control data DATA) when the load signal LOAD is at the "low" level, and carries out the clock CLK counting operations when the load signal LOAD is at the "high" level.

In addition, it is also possible to use the binary counter shown in FIG. 14 in place of the circuit structure shown in FIG. 12 as the binary counter (20).

In the binary counter shown in FIG. 14, in place of the circuit structure of the AND gate (AND gate 311) of the one-increment adder (such as the first step one-increment adder 310) shown in FIG. 10, an AND gate (315) is used for outputting the carry signal CARRY. The basic operations of the binary counter of FIG. 14 are the same as those of the binary counter shown in FIG. 12.

In the pulse width PW of the pulse modulating output SOUT produced by the pulse modulating circuit shown in FIG. 10, the pulse end (trailing) timing is fixed at the trailing time of the following "low" level load signal LOAD. The trailing time of the modulated pulse is changed according to the value in the pulse width control data DATA, thereby adjusting the pulse width. For example, if the pulse width is to be shortened, the value of the pulse width control data DATA is increased, thereby delaying the rising time td of the pulse modulating output SOUT, as shown by the dashed line in the FIGURE. In other words, the pulse modulating output SOUT, which is biased and pulse-width modulated, is always output from the pulse width modulating circuit shown in FIG. 10 during the trailing time of the load signal LOAD.

If, for example, the pulse width modulating signal thus biased is to be used in a flat panel IC driver to drive the flat panel control, distortion in the panel surface may appear directly on the screen or as distortion in the image. In addition, with other control devices, there are problems in which it is difficult to carry out the controls with sufficient ease, even when PWM controls are used.

In addition, when the binary counter shown in FIG. 12 is used, since the maximum frequency at which the one-increment adder can operate is determined by the ripple carry time between the LSB (least significant bit) and the MSB (most significant bit), the maximum frequency being used will be lowered as the number of bits is increased, which is problematic in that the operating speed is decreased.

The binary counter shown in FIG. 14 is also problematic in the same manner as the binary counter shown in FIG. 12. In addition, with the binary counter shown in FIG. 14, the input/output signal wiring of the AND gate is very complex and irregular, thus increasing the surface area of the entire unit when converted to an IC.

The binary counters shown in FIGS. 12 and 14 are problematic in the above manner not only when used in the pulse width modulating circuit shown in FIG. 10, but also when used independently, or when used in other types of circuits.

Thus, the present invention has the objective of offering a pulse width modulating circuit with which it is possible to generate unbiased pulse width modulating signals.

In addition, the present invention has the objective of offering a binary counter which is not only suitable for use with such pulse width modulating circuits, but may also be effectively used with other circuits as well, in terms of its high speed and the simplicity of the circuit construction.

SUMMARY OF THE INVENTION

In order to solve the above problems, the pulse width modulating circuit of the present invention comprises a first circuit which generates set and reset signals based on data indicating the pulse modulation width, so as to position said pulse modulation width near the middle of a time interval for a designated cycle; and a second circuit which comprises a time width which is in accord with the aforementioned pulse modulation width designating data referenced on the aforementioned set and reset signals, which are produced by the first signal generating means, and which generates pulse signals for positioning near the middle of the designated cycle.

DESCRIPTION OF THE PREFERRED EMBODIMENTS

Figure 1:
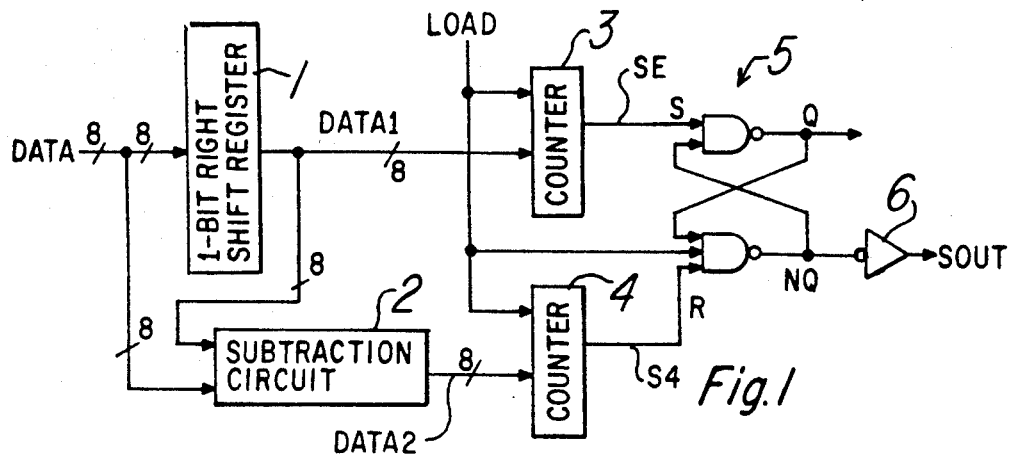
FIG. 1 is a circuit diagram for a first embodiment of a pulse width modulating circuit of the present invention.

FIG. 1 shows a first embodiment of the pulse width modulating circuit of the present invention.

In the FIGURE, the following are connected in the pulse width modulating circuit of the present embodiment: a 1-bit right shift register (1), subtraction circuit (2), left edge counter (3), right edge counter (4), R-S type flip flop (FF) (5), and inverter (6). The left edge counter (3) and right edge counter (4) are binary counters.

Eight bits of pulse width control data DATA are input to the 1-bit right shift register (1) and subtraction circuit (2). The eight bits of pulse width control data DATA designate the modulated pulse width.

Figure 2:
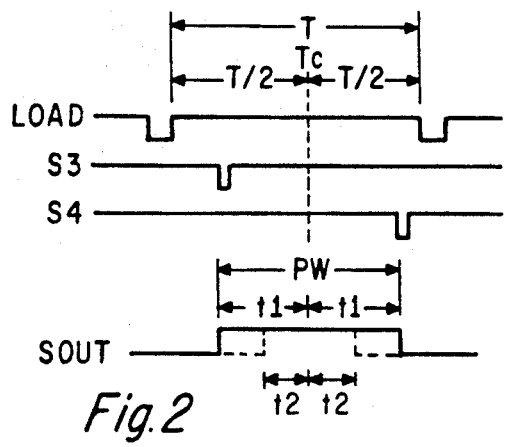
FIG. 2 is a waveform diagram for the pulse width modulating circuit shown in FIG. 1.
Figure 4:
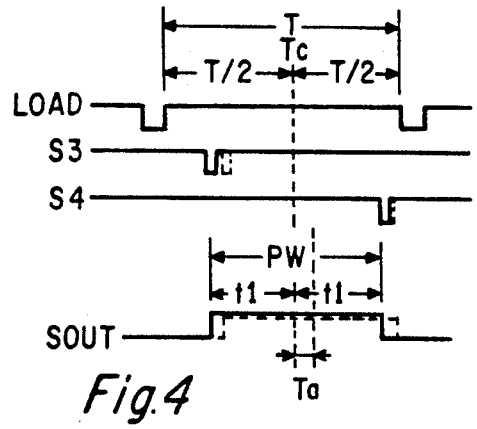
FIG. 4 is a waveform diagram for the pulse width modulating circuit shown in FIG. 3.

The pulse width modulating circuit shown in FIG. 1 will be described with reference to the signal waveform diagram shown in FIG. 2.

The 1-bit right shift register (1) shifts the pulse width control data DATA one bit to the right, then divides the data DATA in half, after which half of the data DATA1 is output to the subtraction circuit (2). A load signal LOAD is applied to the left edge counter (3) and right edge counter (4) as a trigger signal for the binary counters (3) and (4). The left edge counter (3) senses the left edge of the pulse width modulation signal based on the data DATA1 from the 1-bit right shift register (1). In addition, the right edge counter (4) senses the right edge of the pulse width modulation signal based on the subtraction data DATA2 from the subtraction circuit (2).

Specifically, with these circuits, (a) the time for one half of the pulse width designated by the pulse width control data DATA is subtracted from the time of one half of the cycle interval T emitted by the load signal LOAD, to output the start timing of the pulse width modulation signal as a set signal from the left edge counter (3); and (b) the time of one half of the cycle interval T emitted by the load signal LOAD is added to said one half pulse width to output from the right edge counter (4) a reset signal as the end timing of the pulse width modulation.

A carry pulse signal S3 is applied to the set terminal S of the R-S type FF5, thereby setting the R-S type FF5. In addition, a carry pulse signal S4 is applied to the reset terminal R of the R-S type FF5, thereby resetting the R-S type FF5. As a result, the inverted output NQ of the R-S type FF5 is again inverted to produce the pulse width modulation output SOUT from the inverter (6), which, as shown in FIG. 2, becomes a pulse width modulation signal having as a reference the center point Tc in the cycle interval T of the load signal LOAD, and containing the pulse width PW for two times the size of the time t1, which is equivalent to the preceding and following times. In other words, the pulse modulation output SOUT is a signal which contains a pulse width PW that is located in the center of the cycle interval T.

Thus, the 1-bit right shift register (1), subtraction circuit (2), left edge counter (3), and right edge counter (4) are used to generate the carry pulse signal 53 for setting the R-S type FF5 and the carry pulse signal S4 for resetting the R-S type FF5, before and after the center location Tc, which is in the middle of the cycle interval T, as a reference, by calculating the pulse rising and trailing timing, which correspond to the pulse width determined by the value of one half the pulse width PW based on the cycle interval T of the load signal LOAD and pulse width control data DATA. The R-S type FF5 is set or reset by these pulse signals, after which the aforementioned pulse modulation output SOUT is output via the inverter (6).

In terms of timing, the pulse modulation signal is located at all times in the middle of the cycle interval T generated by the load signal LOAD. For example, if the signal of a pulse width which is shorter than the aforementioned is to be generated by changing the pulse width control data DATA, then as shown by the dashed line in FIG. 2, the center Tc of the cycle interval T is used as the reference, making it possible to obtain on either side pulse modulation signals for a pulse width two times the size of the time t2.

Thus, since the 1-bit right shift register (1) is used to cut the pulse width control data DATA in half, if the pulse width control data DATA are odd-numbered, the pulse modulation output SOUT may not be perfectly positioned in the middle of the cycle interval T because of limited dividing capabilities, but it can be thought of as being nearly in the middle.

Figure 3:
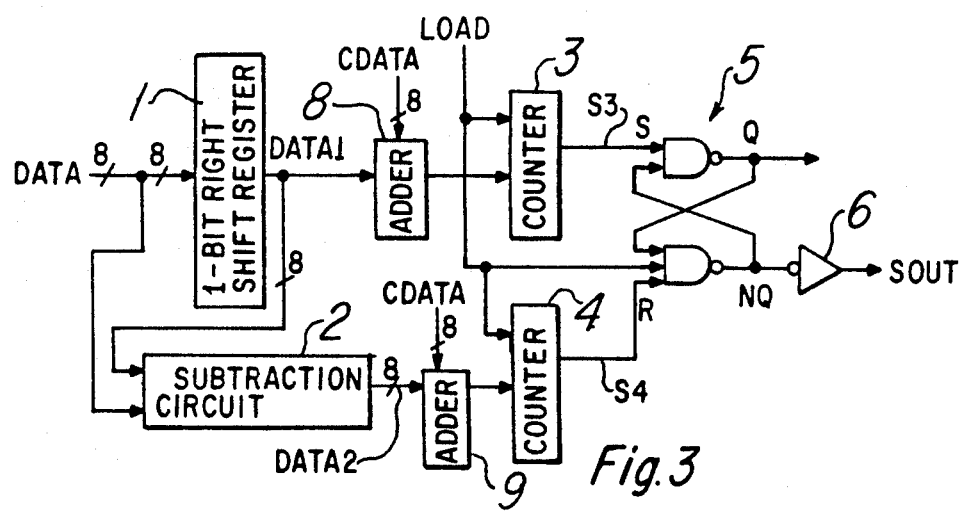
FIG. 3 is a circuit diagram of a second embodiment of the pulse width modulation circuit of the present invention.

When this type of pulse modulating circuit is used, with which the position in the middle of the cycle interval is maintained at all times, it is easy to control a pulse position, when adding circuits (8) and (9), as shown in FIG. 3, for example, are added to the circuit of FIG. 1 to add pulse position correction data CDATA to the data DATA1 and data DATA2. Then, as shown by the dashed line in FIG. 3, the middle of the pulse modulation signal will be shifted away from the center Tc of the cycle interval T by an amount of time Ta based on the pulse position correction data CDATA. Thus, it is possible to obtain a pulse modulation signal with the time (Tc+Ta) as its center, and containing a pulse width of a time two times the size of the time t1, which is equal to the time before and following the center reference (Tc+Ta). Thus, when pulse position correction data are added, the pulse signal is generated in the desired position within the designated cycle interval. When this type of pulse modulation signal is used, the pulse position correction data are used according to the distortions in the flat panel by adding a pulse position correction data to improve the distortion in the flat panel. In addition, it is possible to provide smooth PWM controls when used with other PWM controls as well.

Figure 5:
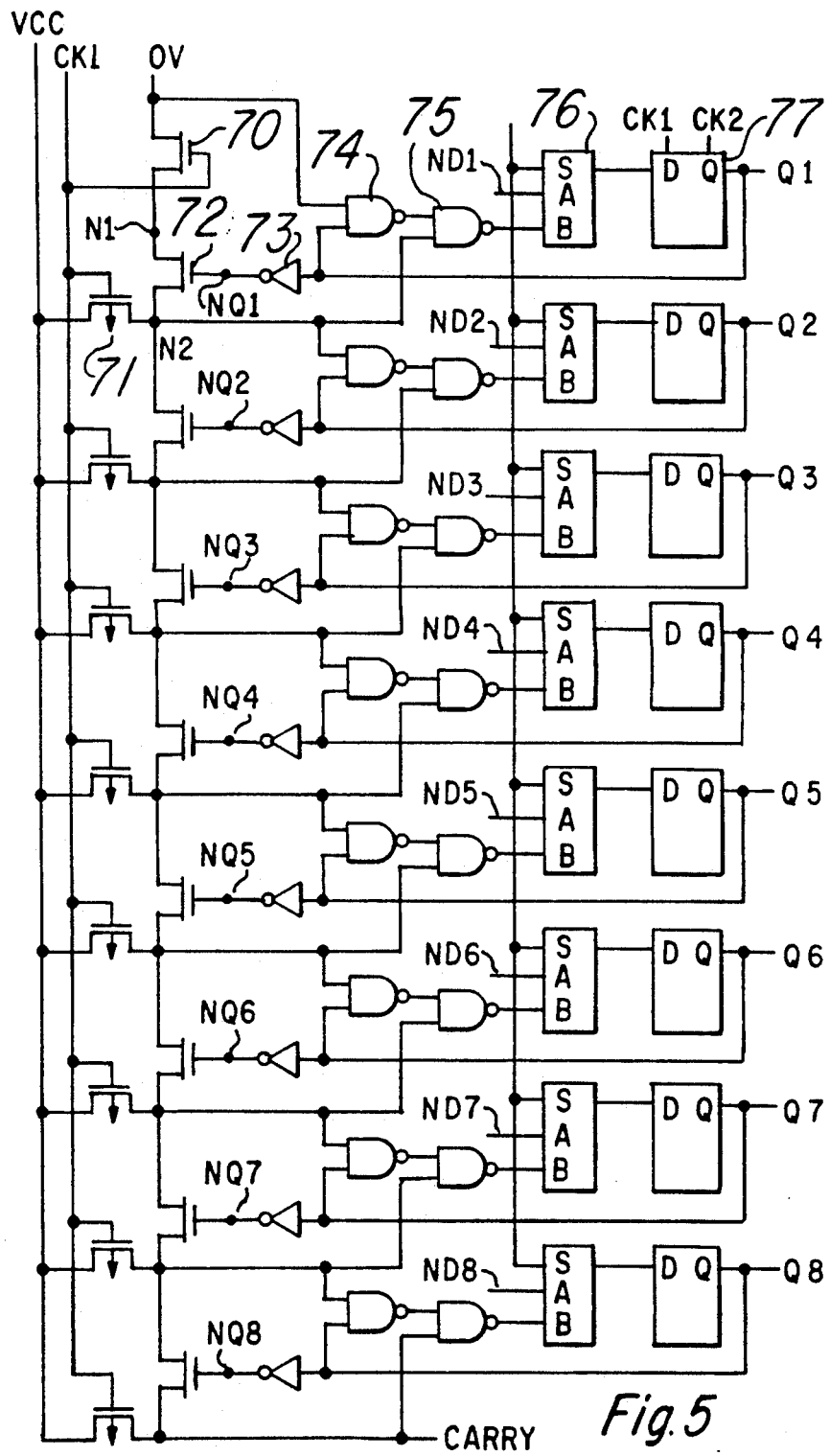
FIG. 5 is a circuit diagram for a counter shown in FIGS. 1 and 3.
Figure 6:
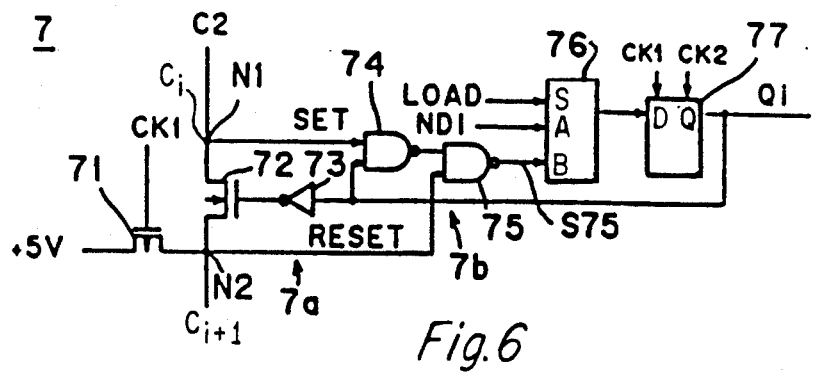
FIG. 6 is a partial circuit diagram of the counter shown in FIG. 5.

FIG. 5 is a circuit diagram of an 8-bit binary counter which is used as the left edge counter (3) and right edge counter (4) of FIGS. 1 and 3. FIG. 6 is a circuit diagram of the various steps in the binary counter of FIG. 5.

In FIG. 6, in the circuit at the first step, for example, a dynamic NAND circuit (7a), modified S-R type FF7b, selector (76), and D-type FF77 are connected as shown.

The dynamic NAND circuit (7a) is driven by a first clock CK1, and contains connections for a p-channel MOS transistor (71), which pulls up the power supply voltage Vcc, for example +5V; an n-channel MOS transistor (72), which is driven by a signal from an inverter (73) which inverts the output of the D-type FF77, and transfers the signal of a node N1 to a node N2; and the inverter (73), as shown in the FIGURE. Thus, the signal $C_i$ of the node N1, Q output $Q_i$ of the D-type FF77, and NAND signal $C_{i+1}$ are output to the node N2. The modified S-R type FF7b, which is constructed with the NAND gate (74) and NAND gate (75), operates as a latch circuit that is set by a signal from the node N1 and reset by a signal from the node N2. The selector (76) selectively outputs the inverted input data $ND_i$ when the load signal LOAD is at the "low" level, or the latch output from the NAND gate (75) when the load signal LOAD is at the "high" level. The D-type FF77 latches the output of the selector (76) in response to the first clock CK1, and outputs the latch output $Q_i$ in response to the second clock CK1. The first clock CK1 and second clock CK1 are reversely correlated.

The circuits from the second step onward also have the same circuit construction and operations as those described above. However, since the initial value is set in the node N1, the first step circuit contains an n-channel MOS transistor (70), which is driven by the first clock CK1 and outputs a low potential (0 V) to the node N1. The inverted input data ND1-ND8, which correspond to the pulse width control data DATA, are applied to the selectors at each step. The carry signal CARRY is output from the node N2 in the final step.

Figure 7:
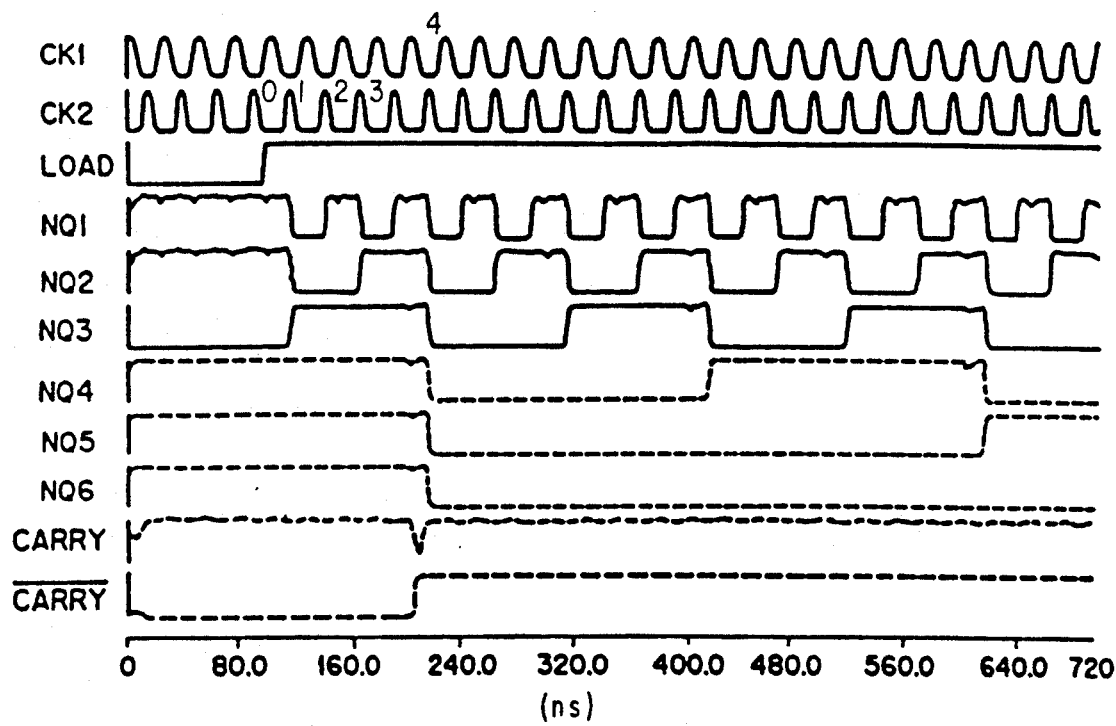
FIG. 7 is a waveform diagram of the counter shown in FIG. 5.

FIG. 7 shows an operational timing diagram for the binary counter circuit (7) shown in FIG. 5 when the pulse width control data DATA=4 (binary number=00000100). In FIG. 7, NQ1-NQ6 denote the output produced by inverting the Q output of the D-type FF (77) with the inverter (73). NQ2 has a pulse width two times as large as that of NQ1, NQ3 has a pulse width two times as large as that of NQ2, NQ4 has a pulse width two times as large as that of NQ3, and continuing in the same manner in the reset of the cases. When the count value reaches 4, the carry signal CARRY is output from the final step.

Specifically, when the first clock CK1 is turned to the "high" level, the pulse width control data DATA are fetched, and when the first clock CK1 turns to the "low" level, the pulse width control data DATA are held. When the second clock CK2 turns to the "high" level, the output $Q_i$ of each of the D-type FF's, which output the data Q from the D-type FF77, is turned to the "low" level according to the pulse width control data DATA, thereby turning on all of the n-channel MOS transistors which are connected in cascade. In addition, when the first clock CK1 is at the "low" level, the n-channel MOS transistor (70) is off, thus allowing the outputs $C_{i+1}$ of each node to be precharged to the "high" level by the P-MOS transistors (71). The first clock CK1 turns to the "high" level, thereby turning off the N-MOS transistor (72) and turning on the n-channel MOS transistor (70), to turn on all of the n-channel MOS transistors which are connected in cascade, at which point the carry signal CARRY turns to the "low" level.

Figure 12:
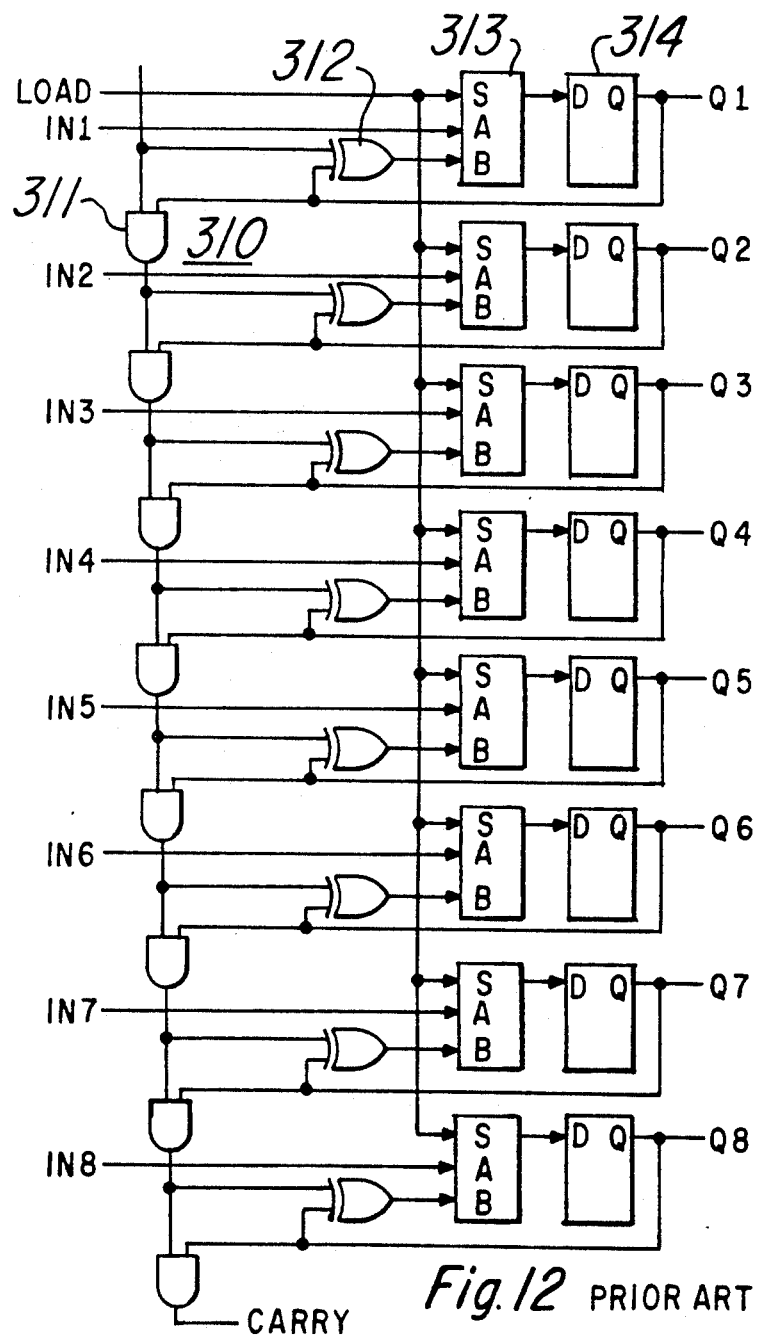
FIG. 12 is a circuit diagram for a conventional binary counter.

The binary counter circuit (7) shown in FIG. 5 will now be compared with the binary counter shown in FIG. 12. A dynamic NAND circuit (7a) is used in place of the static AND circuit used in FIG. 12. Thus, with the binary counter circuit (7) shown in FIG. 5, the critical pass created by the multiple AND gate connections is eliminated, thereby allowing the maximum operating frequency to be determined by the single dynamic NAND circuit. The p-channel transistors, such as the P-MOS transistors (71) of the dynamic NAND circuit (7a), are used only for precharging, and since the n-channel transistors such as the N-MOS transistor (72) have less resistance to being turned on and a quicker rising time than the p-channel transistors, they improve the operating speed of the binary counter (7) shown in FIG. 5. In addition, since the channel width W of the p-channel MOS transistor (71) is small, it is possible to increase the width W of the N-MOS transistor (72). In addition, with the binary counter (7) shown in FIG. 5, since two NAND circuits are used without using EXOR gates such as the EXOR gate (312) shown in FIG. 12, it is possible to make even greater improvements in operating speed since the p-channel transistors do not have a cascade circuit construction.

Figure 14:
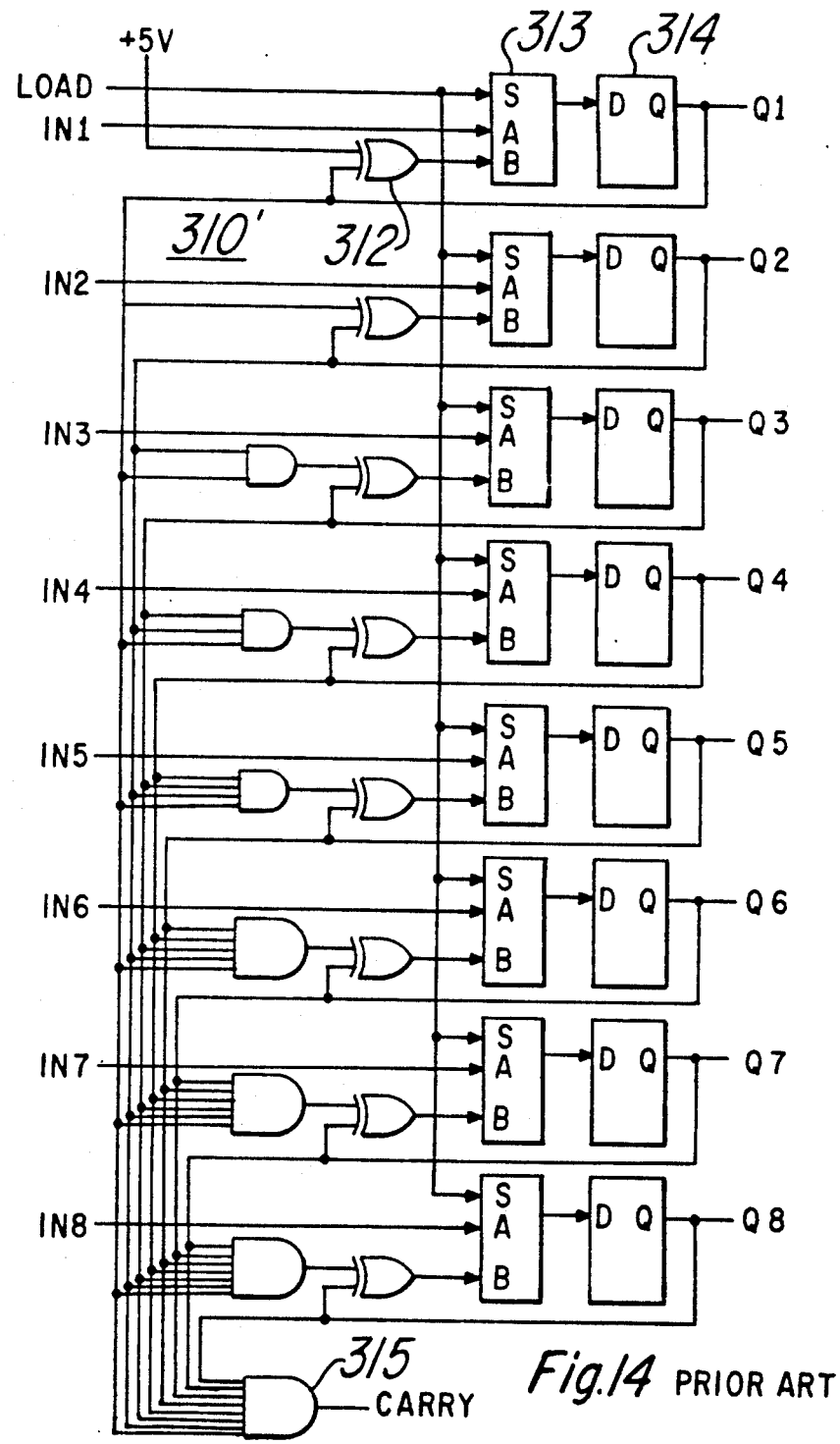
FIG. 14 is a circuit diagram of another conventional binary counter.

The comparison between the binary counter shown in FIG. 14 and the binary counter shown in FIG. 5 is the same as the aforementioned comparison with the binary counter in FIG. 12. In addition, since the binary counter circuit (7) of FIG. 5 does not require complex AND circuit connections, it is possible to reduce its integrated surface area in producing ICs.

When this type of binary counter (7) is used with the pulse width modulating circuits shown in FIGS. 1 or 3, it is possible to improve the operational speed of these pulse width modulating circuits.

Figure 8:
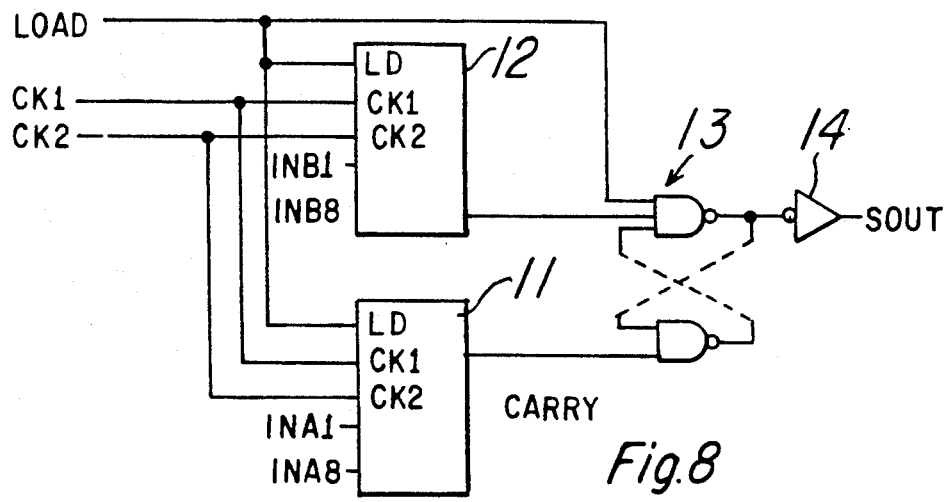
FIG. 8 is a circuit diagram of a third embodiment example of the pulse width modulating circuit of the present invention.
Figure 9:
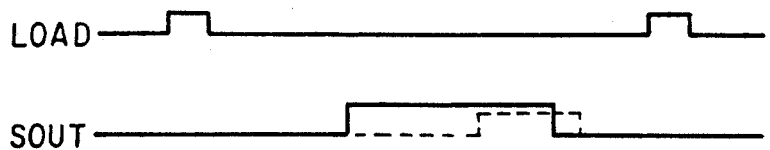
FIG. 9 is a waveform diagram for the pulse width modulating circuit shown in FIG. 8.
Figure 10:
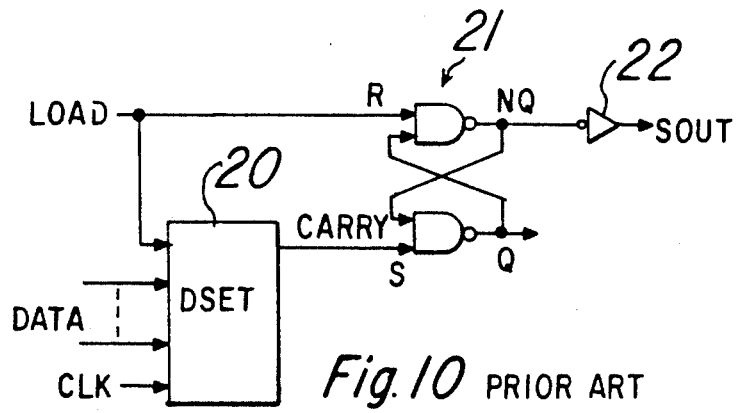
FIG. 10 is a circuit diagram of a conventional pulse width modulating circuit.
Figure 13:
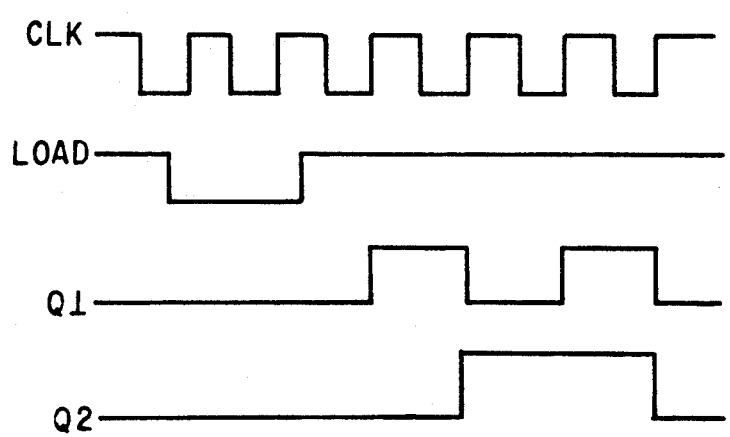
FIG. 13 is a dynamic diagram of operations of the binary counter shown in FIG. 12.
Figure 11:
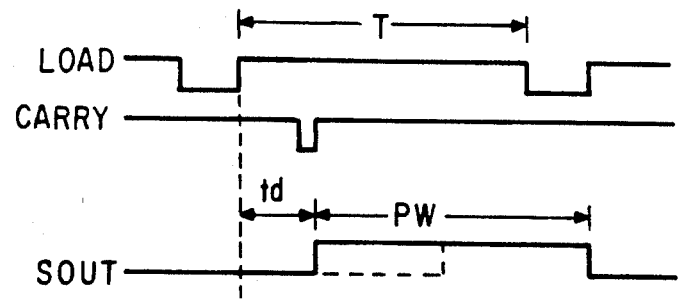
FIG. 11 is a waveform diagram for the pulse width modulating circuit shown in FIG. 10.

FIG. 8 shows the pulse width modulating circuit of a third embodiment of the present invention. With this pulse width modulating circuit, two binary counter circuits such as shown in FIG. 5, are used as a first counter (11) and second counter (12), and connected to an S-R type flip flop (13) and inverter (14). The initial time data INA1-INA8, which designate the pulse rising time, are set in the first counter (11), and the final time data INB1-INB8, which designate the pulse trailing time, are set in the second counter (12). When these time data INA1-INA8 and INB1-INB8 are properly set, the S-R type flip flop (13) is set by the carry signal CARRY from the first counter (11), and the S-R type flip flop (13) is reset by the carry signal CARRY from the second counter (12), thereby making it possible to output the pulse modulation output SOUT and pulse width modulation signal, which is positioned in the middle of the cycle interval T, as shown in FIG. 9.

In addition, when the time data INA1-INA8 and INB1-INB8 are properly set, it is possible to generate the modulation signal for the desired pulse width with the desired timing, as shown by the dashed line.

As described above, with the pulse width modulating circuit of the present invention, it is possible to generate a pulse width modulation signal with the desired timing, and even more importantly, with the desired pulse width located near the middle of the cycle interval.

In addition, with the present invention, it is possible to offer a binary counter which has a simple circuit construction and can operate at high speeds.

What is claimed is:

1. A pulse width modulating circuit comprising: a first circuit which generates set and reset signals based on data indicating the pulse modulation width, so as to position said pulse modulation width near the middle of a time interval for a designated cycle;

and a second circuit which generates a time width pulse signal according to said pulse modulation width designating data, based on said set and reset signals, which are produced by said first circuit.

2. A pulse width modulating circuit comprising:
a one-bit right shift register;
a subtraction circuit;
input means respectively connected to said one-bit right shift register and said subtraction circuit for providing a plurality of pulse width control data bits to both of said one-bit right shift register and said subtraction circuit;
first and second binary counters respectively connected to the outputs of said one-bit right shift register and said subtraction circuit;
logic means connected to the outputs of said binary counters;
said plurality of pulse width control data bits being shifted one bit to the right and divided in half by said one-bit right shift register;
one-half of said plurality of pulse width control data bits being provided as an output by said one-bit right shift register to said subtraction circuit and to said first binary counter;
said first and second binary counters being responsive to a control signal applied thereto for selectively sensing the left and right edges of a pulse width modulation signal based upon the outputs from said one-bit right shift register and said subtraction circuit;
said first binary counter providing a set signal to start timing of the pulse width modulation signal based upon the subtraction of the time for one-half of the pulse width designated by the pulse width control data bits from the time of one-half of the cycle interval of the control signal; and
said second binary counter providing a reset signal to end timing of the pulse width modulation signal based upon the addition of one-half of the cycle interval of the control signal to said one-half pulse width signal, whereby the pulse width signal is located substantially in the center of the cycle interval of the control signal.

3. A pulse width modulating circuit as set forth in claim 2, further including first and second adder circuits;
said first adder circuit being interposed between the output of said one-bit right shift register and the input of said first binary counter;
said second adder circuit being interposed between the output of said subtraction circuit and the input of said second binary counter;
said first and second adder circuits respectively adding pulse position correction data to the output of said one-bit right shift register and the output of said subtraction circuit;
the middle of the pulse width modulation signal being shiftable away from the center of the cycle interval of the control signal by a time amount based upon the pulse position correction data provided by said first and second adder circuits, whereby the pulse width modulation signal may be located in a selected position within the cycle interval of the control signal.

4. A pulse width modulating circuit as set forth in claim 2, further including a flip-flop circuit connected to the outputs of said first and second binary counters and including first and second logic elements arranged in cross-connected relationship with respect to each other, the output of said first logic element being connected to the input of said second logic element, and the output of said second logic element being connected to the input of said first logic element;
said control signal being connected to the input of said second logic element;
said first logic element having a set terminal and said second logic element having a reset terminal;
the output of said first binary counter being connected to the set terminal of said first logic element and the output of said second binary counter being connected to the reset terminal of said second logic element; and
an inverter connected to the output of said second logic element of said flip-flop circuit and producing the pulse width modulation signal as an output.

5. A pulse width modulating circuit comprising:
first and second binary counters;
a flip-flop circuit having first and second logic elements respectively connected to the outputs of said first and second binary counters, said first and second logic elements being cross-connected to each other such that the output of said first logic element is connected to the input of said second logic element and the output of said second logic element is connected to the input of said first logic element;

said first and second binary counters having respective first and second clock inputs for receiving first and second clock signals;

said first and second binary counters and said second logic element of said flip-flop circuit having inputs for receiving a control signal;

said first binary counter being responsive to said first and second clock signals and said control signal for setting initial time data designating the pulse rising time of a pulse width modulation signal;

said second binary counter being responsive to said first and second clock signals and to said control signal for setting the final time data designating the pulse trailing time of the pulse width modulation signal;

said flip-flop circuit being set by the output from said first binary counter to said first logic element of said flip-flop circuit; and said flip-flop circuit being reset by the output from said second binary counter in conjunction with the control signal to provide as an output from said flip-flop circuit the pulse width modulation signal located in a selected position within the cycle interval of the control signal as determined by the initial time data and the final time data.

6. A pulse width modulating circuit as set forth in claim 5, further including an inverter connected to the output of said second logic element of said flip-flop circuit and inverting the output from said flip-flop circuit to produce the pulse width modulation signal.

* * * * *